United States Patent
Monjardin et al.

(10) Patent No.: US 11,904,417 B2
(45) Date of Patent: Feb. 20, 2024

(54) AUTOMATED MATERIAL WELDING

(71) Applicant: International Business Machines Corporation, Armonk, NY (US)

(72) Inventors: Michael Benosa Monjardin, Shenzhen (CN); LiCen Mu, Shenzhen (CN); Mingman Li, Shenzhen (CN); Miao Zhang, Shenzhen (CN); Susan Zhai, Shenzhen (CN); Jia Yu Zheng, Foshan (CN)

(73) Assignee: International Business Machines Corporation, Armonk, NY (US)

( * ) Notice: Subject to any disclaimer, the term of this patent is extended or adjusted under 35 U.S.C. 154(b) by 681 days.

(21) Appl. No.: 16/601,692

(22) Filed: Oct. 15, 2019

(65) Prior Publication Data

US 2021/0107082 A1   Apr. 15, 2021

(51) Int. Cl.
*B23K 9/095* (2006.01)
*G05B 19/418* (2006.01)

(52) U.S. Cl.
CPC ...... *B23K 9/0953* (2013.01); *G05B 19/41885* (2013.01); *G05B 2219/32368* (2013.01); *G05B 2219/33286* (2013.01); *G05B 2219/45135* (2013.01)

(58) Field of Classification Search
CPC .... B23K 9/0953; B23K 9/0956; B23K 9/167; B23K 9/173; B23K 31/125; B23K 9/18; G05B 19/41885; G05B 2219/32368; G05B 2219/33286; G05B 2219/45135
See application file for complete search history.

(56) References Cited

U.S. PATENT DOCUMENTS

| | | | |
|---|---|---|---|
| 4,351,190 A | 9/1982 | Rehme | |
| 5,104,456 A | 4/1992 | Dvornak | |
| 5,552,575 A * | 9/1996 | Doumanidis | ........ B23K 9/0953 219/121.64 |
| 6,393,924 B1 | 5/2002 | Eder | |
| 7,107,118 B2 | 9/2006 | Orozco | |
| 9,050,679 B2 | 6/2015 | Daniel | |
| 10,239,158 B2 | 3/2019 | Albrecht | |
| 2009/0090767 A1* | 4/2009 | Bouse | ...................... B23P 6/007 228/104 |
| 2013/0008548 A1* | 1/2013 | Bowers | ................... F16L 13/02 138/97 |

(Continued)

FOREIGN PATENT DOCUMENTS

| | | |
|---|---|---|
| CN | 102728932 A | 10/2012 |
| CN | 204075455 U | 1/2015 |

(Continued)

OTHER PUBLICATIONS

Kah et al., "Robotic arc welding sensors and programming in industrial applications", International Journal of Mechanical and Materials Engineering, First Online: Jul. 17, 2015, 20 pages.

*Primary Examiner* — Charles R Kasenge
(74) *Attorney, Agent, or Firm* — David K. Mattheis

(57) ABSTRACT

Automated material welding including starting a welding operation, scanning a weld in-progress, creating a simulation of the weld in-progress, detecting a flaw in the weld in-progress according to the scanning and the simulation, remediating the weld in-progress, and completing the welding operation.

15 Claims, 4 Drawing Sheets

(56) References Cited

U.S. PATENT DOCUMENTS

| | | | |
|---|---|---|---|
| 2015/0068663 A1* | 3/2015 | Wang | B29C 66/8322 156/580.2 |
| 2015/0165683 A1* | 6/2015 | Cheverton | B29C 64/124 382/141 |
| 2015/0177158 A1* | 6/2015 | Cheverton | G05B 15/02 700/119 |
| 2016/0090842 A1* | 3/2016 | Luo | B23K 28/02 219/121.64 |
| 2017/0023499 A1* | 1/2017 | Mitchell | B22F 10/28 |
| 2017/0028499 A1 | 2/2017 | Yoshida | |
| 2017/0032281 A1* | 2/2017 | Hsu | G05B 19/41875 |
| 2017/0220927 A1 | 8/2017 | Takigawa | |
| 2018/0292357 A1* | 10/2018 | Leach | G01N 29/262 |
| 2020/0004225 A1* | 1/2020 | Buller | B29C 64/393 |
| 2020/0166909 A1* | 5/2020 | Noone | G06N 20/00 |
| 2020/0279364 A1* | 9/2020 | Sarkisian | G06F 16/252 |
| 2020/0311853 A1* | 10/2020 | Falde | B23K 31/02 |

FOREIGN PATENT DOCUMENTS

| | | |
|---|---|---|
| CN | 104668798 A | 6/2015 |
| CN | 204755545 U | 11/2015 |
| CN | 103499579 B | 1/2016 |
| DE | 4131565 A1 | 4/2002 |
| DE | 10159764 C1 | 2/2003 |
| DE | 102008011349 A1 | 9/2009 |
| DE | 102016008996 A1 | 2/2017 |
| DE | 102017105224 A1 | 9/2017 |
| EP | 3173171 A1 | 5/2017 |
| JP | 2000167666 A | 6/2000 |
| WO | 2015065846 A1 | 5/2015 |

\* cited by examiner

AUTOMATED MATERIAL WELDING

BACKGROUND

The disclosure relates generally to automated material welding. The disclosure relates particularly to automatically detecting and remediating weld flaws.

Automated systems exist for welding materials. Such systems can include automated fixtures to hold the discrete parts in place as well as automated welding systems. Weld quality may be verified using visual and non-destructive testing (NDT) regimens including ultrasonic and x-ray scans of completed welds.

SUMMARY

Aspects of the invention disclose methods, systems and computer readable media associated with automated material welding including starting a welding operation, scanning a weld in-progress, creating a simulation of the weld in-progress, detecting a flaw in the weld in-progress according to the scanning and the simulation, remediating the weld in-progress, and completing the welding operation.

DETAILED DESCRIPTION

Figure 1:
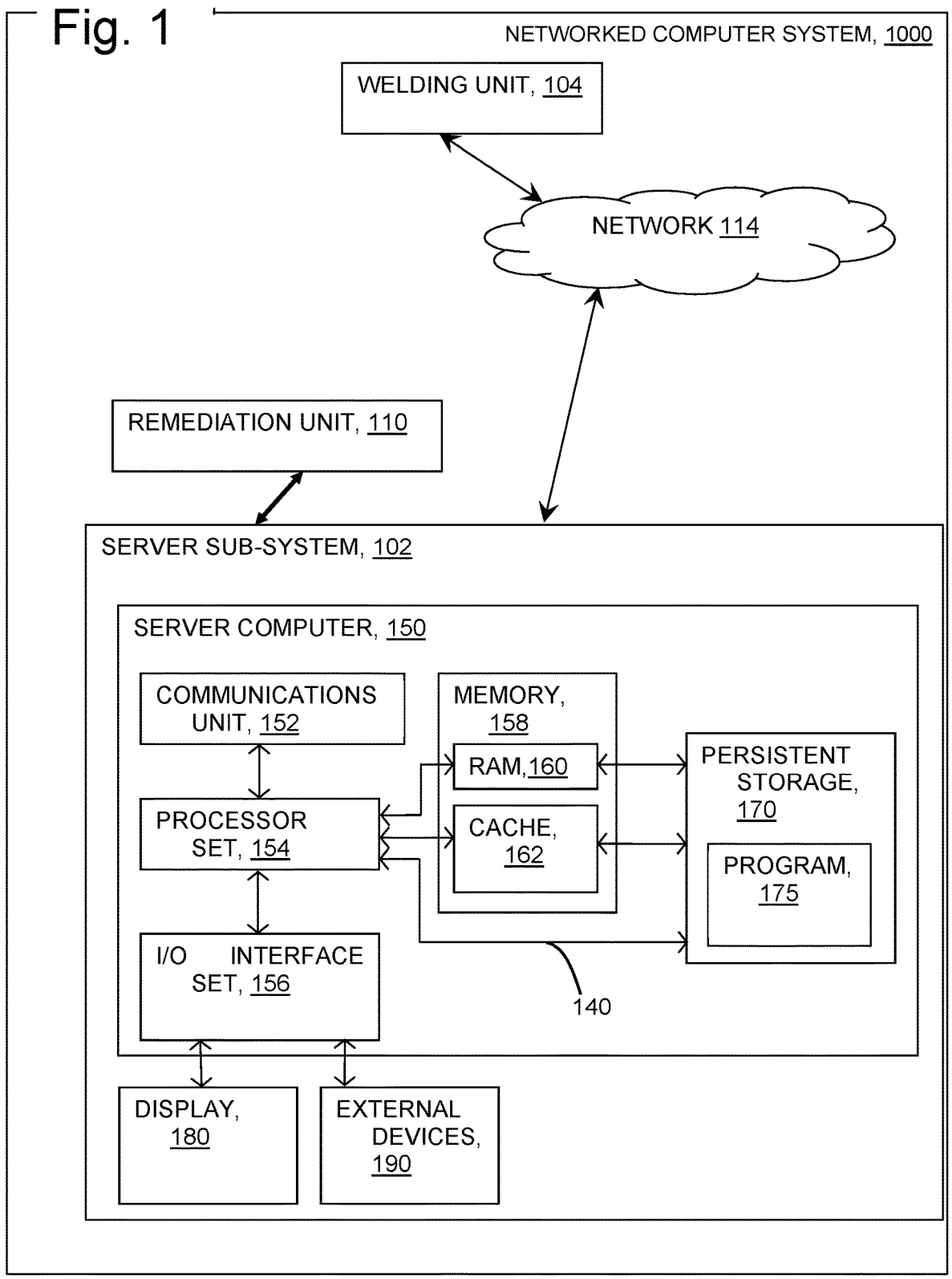
FIG. 1 provides a schematic illustration of a system, according to an embodiment of the invention.

Most metals can be welded, and welding provides an efficient means to create complex, strong and lightweight parts. A quality welding process must meet application objectives relating to weld integrity and must be repeatable. Unfortunately, weld defects and discontinuities cannot be avoided. Weld flaws, such as incomplete fusion, incomplete penetration and overlap, may be detectable by visible inspection, but in some instances require non-destructive testing, x-rays, or ultrasonic testing to detect. Weld flaws typically require manual remediation and result in lost productivity.

Incomplete fusion occurs when weld metal does not form a cohesive bond with the base metal of the weldment. Incomplete fusion can be caused by low amperage, steep electrode angles, fast travel speed, short arc gap, lack of preheat, electrode too small, unclean base metal or weld arc off seam. Incomplete fusion can be prevented by identifying and eliminating the underlying cause(s).

When the extent of the flaw cannot be determined using NDT, it may be necessary to remove the entire weld bead by grinding or milling. The removal must be precise to avoid removing material form the parts of the assembly. (Such removal necessitates building the part(s) back up or discarding the damaged part(s)). Material removal is checked using a dye penetrant test and material is removed until such tests indicate that all weld material has been removed. After the weld material has been removed the parts are prepped and tempered as needed for rewelding.

Incomplete penetration occurs when the weld metal does not extend to the required depth into the joint root. Incomplete penetration is caused by low amperage, low preheat, tight root opening, fast travel speed, and short arc length. Incomplete penetration is prevented by identifying and correcting contributing factor(s). Remediation of the incomplete penetration requires removal of the weld material and rewelding as described above.

Burn through—excessive penetration—occurs when an undesirable open hole has been completely melted through the base metal. The hole may or may not be left open. It is caused by excessive heat input. Burn through is prevented by reducing heat input through increasing travel speed, using a heat sink, or reducing welding parameters. The flaw may be correctable by filling the weld. Removal of the weld material and rewelding may be required.

Weld porosity, holes in the weld, can be single pores separated by the pore diameter, scattered pores across the weld, cluster porosity—typically viewed as single flaw, and linear porosity—along the length of the weld, reducing weld integrity. Porosity is caused by low amperage, a short arc gap, or an unshielded weld start. A single pore can be removed with rotary grinding tools and filled. Larger areas and linear porosity require grinding or milling of the larger affected portion of the weld and rewelding.

Weld overlap occurs when the face of the weld extends beyond the toe of the weld. Overlap is caused by improper welding technique, typically, improper electrode angles and travel speed. Overlap is a contour problem. Proper welding technique will generally prevent this problem. Overlap is repaired by removal and rewelding. Care must be taken not to remove portions of the parts and to avoid creating deep grind marks that run transverse to the load of the weldment. NDT should be used to check for fusion discontinuities hidden by the grinding.

What is needed is an automated system and method to detect and remediate weldments to eliminate flaws in the welds to reduce the need for manual remediation of welded parts.

In an embodiment, a system includes a plurality of coordinating operational units. In an embodiment, the system includes a controller/processor. The controller includes computing and data processing elements which contain the necessary programing to control the respective units of the system. In an embodiment, each of the respective operating units includes additional computing elements. In this embodiment, the various units communicate with each other. The controller passes instructions to the other units which then process and carry out the instructions.

In an embodiment, the system includes a welding unit. The welding unit includes an automated pick-and-place system to collect and assemble the respective portions of the weldment. In an embodiment, the pick-and-place system uses machine vision elements, such as cameras, to locate the portions at a storage location and then utilizes programmed end-effectors to grasp, orient and place the identified portions. The system assembles the collected portions into the configuration of the weldment and fixes the portions in place using fixtures and clamps. The portions may include alignment features, such as alignment pins or holes corresponding to features of the fixtures, which enable the pick-and-place system to place the portions in stable positions for welding.

In an embodiment, the welding unit also comprises the welder. In this embodiment, the welder comprises an automated Tungsten Inert Gas (TIG), metal inert gas (MIG), gas metal arc welding (GMAW), flux-cored arc welding (FCAW), shielded metal arc welding (SMAW), or other welding process component. In an embodiment, the system controller/processor unit controls the welding component. In an embodiment, a combination of the controller and a local processor, receiving commands from the system controller, control the welder.

In an embodiment, the portions of the weldment are manually selected and assembled into the weldment. The system then clamps the assembled portions into position for welding. In this embodiment, the system includes one or more reference files associated with each potential weldment. The reference files include data regarding the individual portions of each weldment together with data regarding the portions of the weldment, such as the materials, dimensions, and dimensional tolerances, of the portions, portion storage locations, as well as programming for the identification of the portions from storage, and the assembly of the portions into the weldment by the pick-and-place systems.

In an embodiment, each part includes an identifier such as a one- or two-dimensional bar code which the system scans. The identifier is affixed to the portion directly or to the storage location of the portion. The bar code identifies the part and the associated reference files including data regarding the assemblies the parts is related to. In this embodiment, a system operator selects the desired weldment, and the controller identifies which parts are needed from the reference files for the weldment and instructs the pick-and-place system to retrieve and assemble the requested weldment. In this embodiment, the system operator scans a barcode associated with the weldment to instruct the system to assemble and fabricate the weldment.

In an embodiment, a single robotic positioning system moves the welding and remediation units relative to the weldment. In an embodiment, two independent systems move each of the welding unit and remediation unit independently. In an embodiment, a third positioning system moves a detection unit with respect to the position of the weldment. Each of the robotic systems is either locally controlled or under the control of the controller/processor unit.

In an embodiment, the system also includes a tempering unit to thermally condition parts prior to and after welding to minimize thermal stress/strain development and reduce the development of brittleness in the parts. In an embodiment, the tempering unit includes induction heaters, heated air-flow systems and infra-red heaters to alter the temperature of the parts prior to, during and after the welding process. In an embodiment, the tempering unit include an air handling system capable of producing both hot and cold air to raise or lower the temperature of the parts as needed. The controller instructs the tempering unit according to data in the reference files associated with the respective weldments.

In an embodiment, the system includes a detection unit. In this embodiment, the detection unit includes one or more scanning sensors, such as bar code, temperature/infra-red sensors, ultrasonic sensors, optical/machine vision sensors, x-ray sensors, air flow sensors, and other sensors as may be needed to evaluate weld integrity and quality. The detection unit scans the weldment to detect and inspect the physical dimensions, depth, exact location and length of the planned weld as well as the weld in-progress and completed weld. The unit also determines the temperature of the weldment as the welding operation progresses, monitors the visual appearance of the weldment as the operation proceeds, and tracks the welding environment in terms of the welding edge condition, weld contamination and environment air-flow.

In an embodiment, the system scans the assembled weldment portions prior to the onset of welding operations. The system optically, ultrasonically, or otherwise scans the portions to determine their size, shape and position. The system then compares the scanning output to reference data for the portions and the assembled weldment to ensure that the portions are correct, have the proper dimensions, are within specified tolerances for part dimensions, and are properly assembled into the weldment. In an embodiment, the system evaluates the scanned weldment data and determines the location of the necessary welds as well as the thicknesses of the portions to be welded.

After the pre-weld scan of the assembled weldment, the welding operation commences. In an embodiment, the system moves the weldment with respect to a stationary welder. In an embodiment, the system moves the welder with respect to the weldment. In an embodiment, the system moves each of the weldment and welder to complete the welding operation.

In an embodiment, the detection unit scans the weldment as the welding operation proceeds. In this embodiment, the detection unit scans the weldment optically or ultrasonically to monitor the physical location, depth, and dimensions of the weld. In this embodiment, the detection unit monitors the optical reflections from the weldment. The controller analyzes the reflection data to detect any deformations in the parts of the weldment as the welding operation proceeds. During detection, the weldment may be illuminated by system lighting, including illumination by polarized light sources, to detect the development of deformations and stress in the parts of the weldment.

In an embodiment, the detection unit senses the temperature of the weldment and weld as the welding progresses by detecting IR radiation emanating from the weldment. In an embodiment, the system detection unit uses ultrasonic and/or x-ray scanning to monitor the ongoing quality of the progressing welding operation. In an embodiment, the detection unit monitors welding environment air-flow to ensure that sufficient air or welding gas flow is present to enable a quality weld. In this embodiment, the detection unit includes gas specific sensors to detect the correct welding environment gas in addition to detecting sufficient gas flow.

In an embodiment the controller compares the collected detection unit data with historical data associated with acceptable and unacceptable welds. In an embodiment, the controller comprises a machine learning element trained using reference and sensor data from previous fabrication of weldments. In an embodiment, the data includes real time welding parameters in addition to the detection unit data. In an embodiment, the machine learning element comprises a neural network element trained with data on different weldments and sensor data associated with acceptable and unacceptable welds performed on those weldments. The machine learning element associates real time optical and temperature data with either acceptable or unacceptable weld quality—the presence or absence of weld flaws. In this embodiment, the detection unit data passes to the machine learning element. The machine learning element processes the data and identifies the ongoing weld as acceptable or unacceptable.

In an embodiment, the machine learning element continuously refines the weld quality model. In this embodiment, the machine learning element uses the data from each weldment fabrication to refine the weightings of the neural network, yielding a continuously updated weld quality model.

In an embodiment, acceptable welds are those welds having fewer flaws than a defined weld flaw threshold. In an embodiment, the flaw threshold is multi-dimensional, having individual thresholds for different weld flaws. One of ordinary skill in the art will appreciate that many different thresholds can be defined for different weldments and different classes of weld flaws.

In this embodiment, the controller receives data from the welding operations unit indicating the progress of the welding operations, including the welding operation parameters, amperage, arc length, weld speed, etc. The controller also receives data from the detection unit, both prior to and during the welding operation. In an embodiment, the controller analyzes the pre-weld scan data to identify weld locations and dimensions as well as the locations and dimensions of the respective portions of the weldment. In this embodiment, the controller saves this information as reference locations and dimension in the event that remediation of the welding operation is required.

In an embodiment, the controller receives temperature and NDT data as the welding operation proceeds. In this embodiment, the controller analyzes the temperature data and maps the temperature of the weldment during the welding operation to identify thermal stress/strain development in the weldment. The controller also analyzes the NDT data to identify the presence and location of weld flaws.

In an embodiment, the controller machine learning element simulates the appearance of the weldment from the optical and/or ultrasonic data and thermal stress/strain development in the weldment from the temperature data as well as the data regarding the size, shape, and dimensions of the weldment portions from the weldment reference data and pre-weld scans.

In an embodiment, the system monitors the welding operation in real time and identifies flaws in the weld. In this embodiment, the system utilizes scan data and reference data to define the location of each flaw. The system uses the defined flaw locations to direct remediation activities to eliminate the flaw. In an embodiment, the system completes each weld and then scans the completed weld for flaws, defining flaw locations and generating instructions for remediation according to the flaw type, location and the reference data regarding the parts of the weldment. In an embodiment, the system scans the welding operation in progress, noting the formation of flaws as well as their type and location. In this embodiment, the system defines flaw locations and generates remediation instructions for each flaw. In this embodiment, the system remediates flawed portions of the completed weld. In an embodiment, the system monitors the weld in-progress and detects flaws as described above. As the system detects a flaw, the system defines the location and nature of the detected flaw, generates remediation instructions according to the type and size of the flaw, pauses the welding operation, and remediates the flawed portion of the weld. In this embodiment, the system resumes the welding operation after the flaw has been remediated and eliminated.

In an embodiment, the system includes remediation elements as a remediation unit. In this embodiment, the remediation end-effectors for operations including grinding, milling, sanding, etc., are each mounted on one of a plurality of spindles on a single rotating turret assembly. In an embodiment, each tool station includes a quick release tool chuck to facilitate changing remediation end-effectors. In this embodiment, the turret rotates to indexed locations to change which of the respective end-effectors and associated drive spindle is in the proper position to be applied to the parts and the weld. In an embodiment, the remediation spindles are spring loaded and also include pressure sensors, such as load cells, to measure the pressure of the end-effector against the weldment.

In an embodiment, the respective remediation stations of the turret also include a blower unit which can be articulated to direct air-flow toward the weld as it is being remediated to remove debris created by the remediation operations. In an embodiment, the blower unit is independent from the remediation turret and can be separately positioned near the assembled weldment.

In an embodiment, the remediation unit includes a penetrant application unit adapted to apply a dye penetrant to the weldment as remediation progresses. In this embodiment, the system applies penetrant as a liquid to the weldment. The system scans the weldment to determine if all traces of the weld have been removed by the remediation operation. In this embodiment, remediation continues until the application and scanning of penetrant indicates that all weld traces have been removed.

In an embodiment, the controller instructs the remediation unit to remediate and eliminate a detected flaw. In this embodiment, the system passes information to the remediation unit regarding the location of the flaw as well as the remediation operations required to eliminate the flaw. The instructions include precise dimensions regarding material removal to prevent the removal of material from the parts of the weldment.

In an embodiment, the generated instructions include specifications regarding which remediation operation, grinder, sander, mill cutter, to apply to the flaw to remediate the flawed weld area. In this embodiment, the generated instructions include a series of remediation operations, milling, grinding and sanding, etc. to remove the flaw and prepare the part surfaces for rewelding. In an embodiment, the system scans the weldment during remediation to monitor the remediation process. The scans include optical, thermal and other NDT scans to ensure that the remediation operations do not introduce new flaws in the weldment by deforming parts or by causing excessive thermal stress/strain in the parts leading to material tempering issues. In an embodiment, the system monitors the thermal profiles of the weldment parts to determine if the weldment needs to be re-tempered. In this embodiment, the system generates tempering instructions for parts having thermal profiles indicating issues due to the remediating operations.

In an embodiment, the machine learning element of the system evaluates the remediation scan data according to its training to identify thermal profile or optically detected issues arising from the reweld operations.

In an embodiment, the machine learning element evaluates the correlation of welding and remediation parameters with identified flaws. The machine learning element modifies welding and remediation parameters according to this evaluation, to reduce the rate of flaws in welds. In this embodiment, the system uses Bayesian belief network or similar analysis of the weld parameter, remediation and identified flaw data to associate weld parameter and remediation operations with flaw incidence.

In an embodiment, the system continues the sequence of weld—detect flaws—remediate flaws—weld, until the necessary welds of the weldment, according to the weldment's reference files, are completed. In this embodiment, the system then moves the completed weldment to a storage location designated by the reference files, and the process of fabricating another weldment begins. In one embodiment, the next weldment is identical to the previous weldment. Alternatively, the next weldment differs from the previous weldment. The system can be configured to accommodate the mass production of a single weldment or the production of a series of distinct weldments according to either a predetermined or continuously updating production queue.

FIG. 1 provides a schematic illustration of exemplary network resources associated with practicing the disclosed inventions. The inventions may be practiced in the processors of any of the disclosed elements which process an instruction stream. As shown in the figure, a networked remediation unit 110 connects wirelessly to server sub-system 102. Welding unit 104 connects wirelessly to server sub-system 102 via network 114. Welding unit 104 and remediation unit 110 comprise automated welding and monitoring program (not shown) together with sufficient computing resource (processor, memory, network communications hardware) to execute the program. As shown in FIG. 1, server sub-system 102 comprises a server computer 150 which functions as the controller processor of the system. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the automated welding and monitoring program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of welding units 104, and remediation unit 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., automated welding and monitoring program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
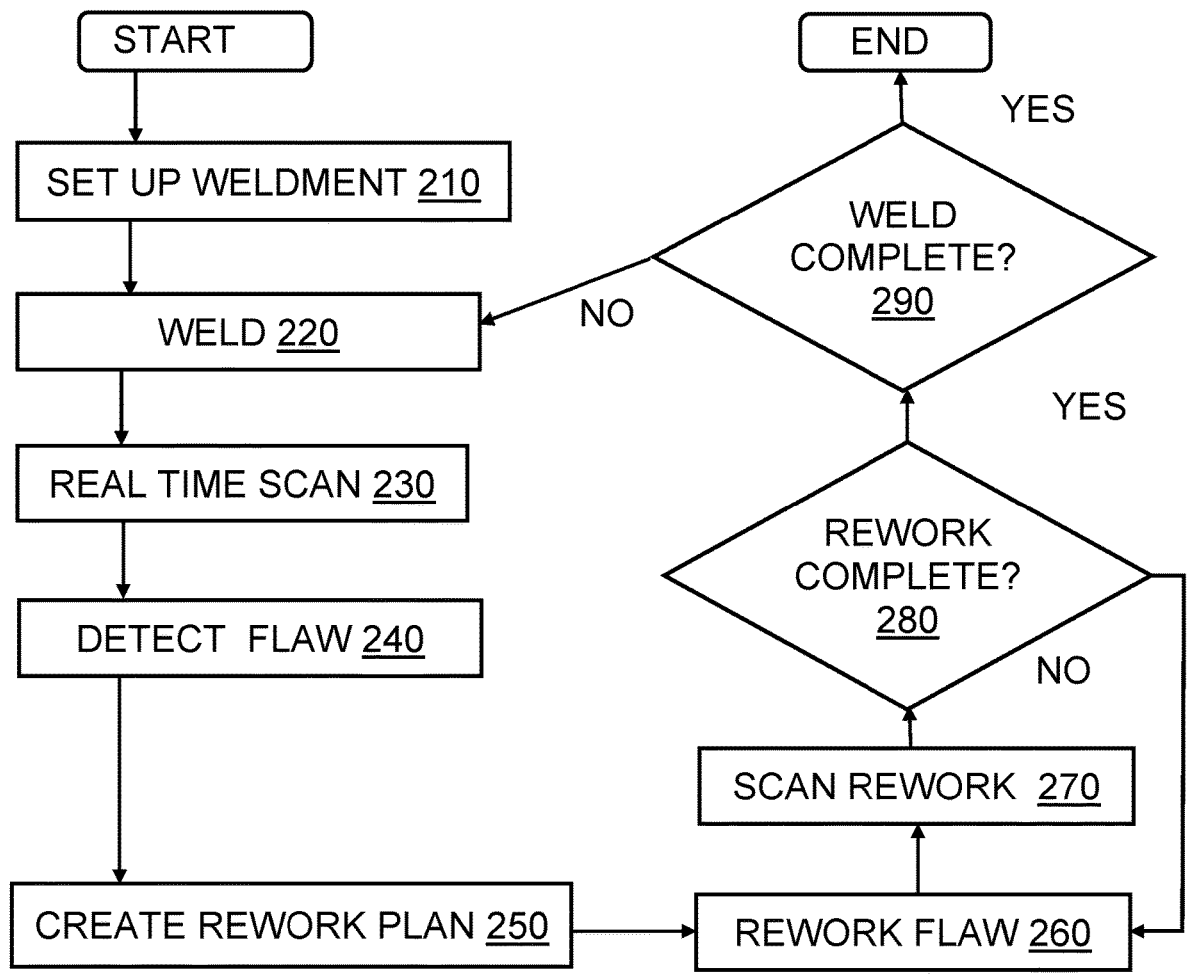
FIG. 2 provides a flowchart depicting an operational sequence, according to an embodiment of the invention.

FIG. 2 provides a flowchart 200, illustrating exemplary activities associated with the practice of the disclosure. After program start, at 210, controller processor 150 sets up the weldment for fabrication. In an embodiment, a system operator manually collects and assembles and secures the weldment parts using an appropriate fixture. In this embodiment, the controller processor 150 connects the assembled weldment/fixture combination to the robotic scanning—welding—remediation units for fabrication.

In an embodiment, the controller processor 150 checks a production queue to identify the next weldment for fabrication. In this embodiment, controller processor 150, checks the reference files associated with the specified weldment. The welding unit automatically collects the required parts from storage locations and assembles the parts using robotic pick-and-place elements according to the welding program. In this embodiment, the controller processor 150, presents the assembled weldment to the scanning—welding—remediation units for fabrication.

At 215, the detection unit of the controller processor 150, scans the presented weldment. The detection unit scans the weldment to detect and inspect the physical dimensions, depth, exact location and length of the planned weld. In an embodiment, the controller processor 150, reconciles the scan data with reference data associated with the weldment to ensure that each part of the weldment meets specified dimensional tolerances and that the assembled weldment also meets specified tolerances in terms of gaps between parts, degree of parallelism between weld joint parts, etc. The controller processor 150, identifies weldment part and weld reference locations within a coordinate system for use during welding and remediating operations.

At 220, the controller processor 150, begins welding operations according to instructions associated with the weldment and the defined weldment and weld reference locations from the initial scan of the weldment. In an embodiment, the welding operations include tempering the weldment prior to commencing welding. In this embodiment, the tempering unit heats the weldment to a specified temperature. The detection unit monitors weldment temperature, or by temperature sensors of the tempering unit itself.

At 230, the detection unit of controller processor 150, scans and monitors the welding operation in real time. In an embodiment, the controller processor 150, collects, optical, thermal, welding parameter, and NDT data related to the weld in-progress. In this embodiment, the controller processor 150, evaluates the real time data using historical data and a controller processor 150, machine learning element. In this embodiment, the controller processor 150, simulates the development of thermal stress/strain profiles in the weldment along with possible deformation of the parts, and the formation of weld flaws.

At 240 the controller processor 150, monitors the real time data and simulation results to detect and identify weld flaws. The controller processor 150, machine learning element detects the flaws according to deviations between real time data and historical data associated with acceptable weld, according to simulation outputs indicating a flaw is forming, or according to a combination of the real time data and the simulation outputs. In an embodiment, the controller processor 150, identifies the size, location and nature of the flaw. In this embodiment, the controller processor 150, generates remediation instructions associated with the identified flaw. In this embodiment, the remediation instructions include, the location of the flaw, the remediation operation(s) to be performed to remove the flaw, including the specific remediation end-effector and the spindle speed for the remediation operation, and the amount of material to be removed by the operation(s).

At 250, the controller processor 150, sends the generated remediation instructions to the remediation unit 110. The remediation unit 110 processes the instructions, if necessary, the remediation unit 110 loads a spindle with the specified remediation end-effector. The remediation unit 110 rotates the remediation turret as needed to present the selected end-effector to the weldment. The remediation unit 110 utilizes the weldment and flaw location data from the controller to present the end-effector precisely at the location of the weld flaw.

At 260, the system, remediation unit 110 begins remediating the flawed weld by removing material from the weld. The remediation unit 110 uses dimensional data from the controller to determine how much material to remove from the flawed weld area. In an embodiment, the remediation unit 110 applies a multitude of end-effectors to completely eliminate the flaw and prepare the part(s) surface(s) for rewelding.

At 270, the detection unit scans the remediation operations in-progress. The controller processor 150, analyzes the scan data to ensure that the remediation is proceeding properly, and that deformations or thermal stress/strain issues are not created by the remediation operations. In an embodiment, the scan data includes optical, thermal and NDT data.

At 280, the controller processor 150, determines if the remediation operations have corrected the flaw and left the parts ready for rewelding. In an embodiment, the controller processor 150, detection unit scans the remediated area and determines the dimensions of the parts. The determined dimensions are compared to the reference dimensions and tolerances to ensure that the remediated parts are acceptable. The controller processor 150, reviews the remediation operation history to ensure that the thermal profile of the remediation operations does not indicate the creation of issues requiring the parts to be tempered again. In an embodiment, a dye penetrant is applied to the remediated parts and the parts are scanned to ensure that all weld material has been removed from the parts. In an embodiment, the parts are cleaned to remove all traces of the penetrant.

In an embodiment, when the determination indicates that the remediation operations haven't sufficiently corrected the flaw, the controller processor 150, generates additional remediation according to the detected remediation deficiency. The controller processor 150, returns to step 260 and to execute the additional remediation instructions. In this embodiment, the controller processor 150, then proceeds to step 270 to have the detection unit scan the remediation progress and step 280 to evaluate the scan data.

In an embodiment, when the controller processor 150, determines that the remediation operations have corrected the flaw, the controller processor 150, checks the completeness of welding operations at 290. The controller processor 150, resumes welding incomplete welds at 220. In this embodiment, the controller processor 150, detection unit resumes real time scanning of the weld in-progress at step 230 as described above. Completed welds lead to the end of the program operations.

Figure 3:
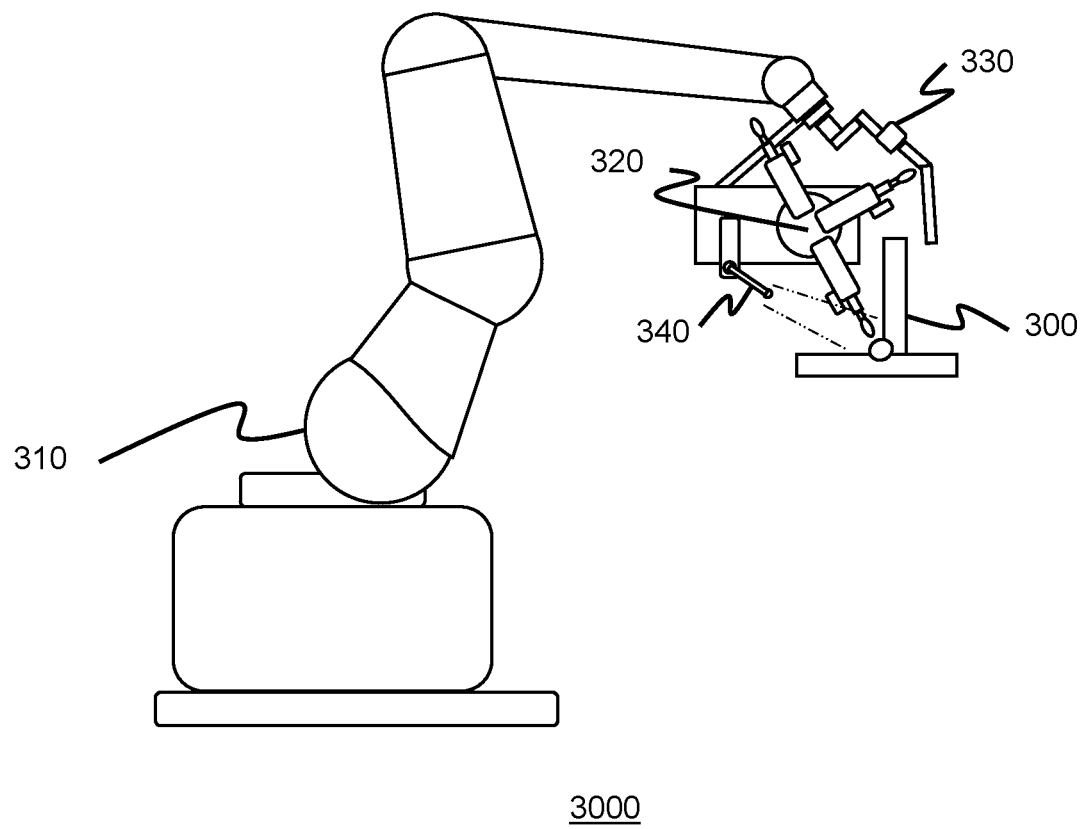
FIG. 3 provides a schematic illustration of a robotic welding system, according to an embodiment of the invention.
Figure 4:
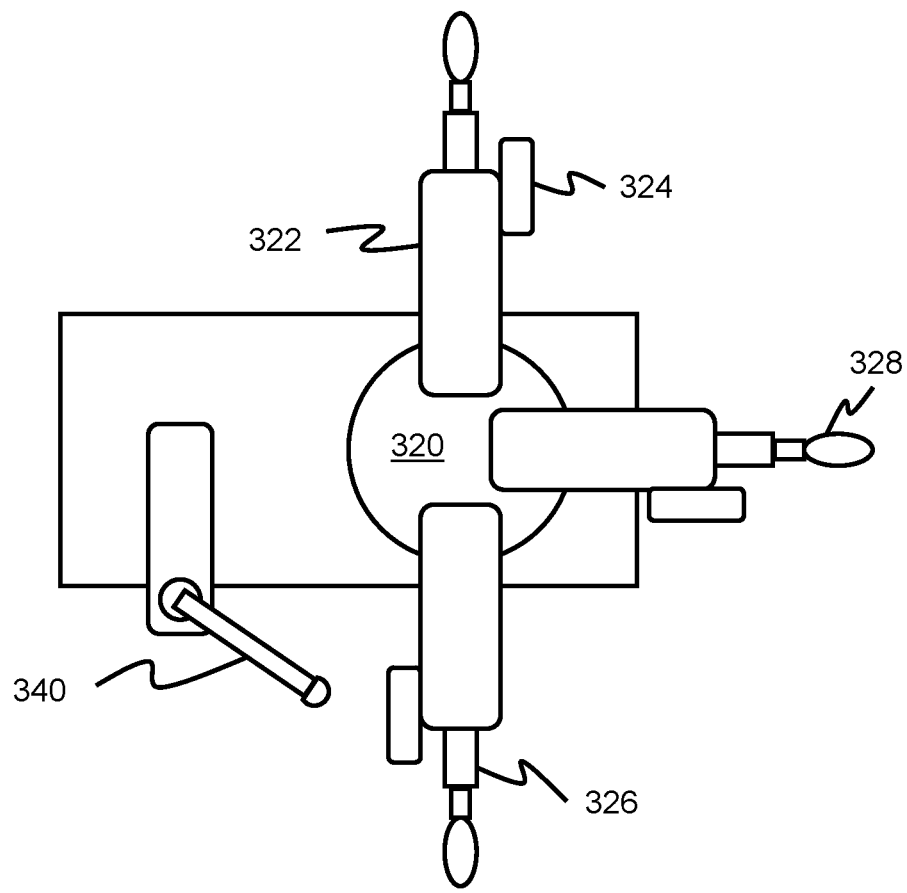
FIG. 4 provides a schematic illustration of remediation and detection units, according to an embodiment of the invention.

FIG. 3 provides an illustration of an automated welding—remediation system 3000. As shown in the figure, a robotic arm 310 controls the location of remediation turret 320, NDT element 330, and detection unit sensors 340, with respect to the weldment 300. FIG. 4 provides a schematic illustration 4000, of detection unit sensors 340 and remediation turret 320 components. As provided in the figure, detection unit sensors 340 are disposed to provide a scanning viewpoint of the weldment (not shown). Remediation turret 320 includes spindles 322, adjustable blower units 324, remediation operation elements 326 disposed in spindles 322, and abrasive elements 328 as part of remediation operation elements 326.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for automated material welding, the method comprising:
    collecting a reference scan of parts prior to starting a welding operation;
    starting the welding operation;
    scanning a weld;
    creating a machine learning simulation of the appearance of the weld;
    detecting a flaw in the weld according to the scanning and simulation;
    remediating the flaw, wherein the flaw is remediated according to the reference scan of the parts; and
    completing the welding operation.

2. The computer implemented method according to claim 1, further comprising thermally tempering the weld.

3. The computer implemented method according to claim 1, wherein creating the simulation of the weld comprises simulating weld thermal stress/strain.

4. The computer implemented method according to claim 1, wherein remediating the flaw comprises selecting remediation tooling according to weld type.

5. The computer implemented method according to claim 1, wherein scanning the weld comprises collecting infra-red data about the weld.

6. A computer program product for automated material welding, the computer program product comprising one or more computer readable storage medium and stored program instructions on the one or more computer readable storage devices, the stored program instructions comprising:
    program instructions to collect a reference scan of parts prior to starting a welding operation;
    program instructions to start the welding operation;
    program instructions to scan a weld;
    program instructions to create a machine learning simulation of appearance of the weld;
    program instructions to detect a flaw in the weld according to the scanning and simulation;
    program instructions to remediate the flaw, wherein the flaw is remediated according to the reference scan of the parts; and
    program instructions to complete the welding operation.

7. The computer program product according to claim 6, the stored program instructions further comprising program instructions to thermally temper the weld.

8. The computer program product according to claim 6, wherein creating the simulation of the weld comprises simulating weld thermal stress/strain.

9. The computer program product according to claim 6, wherein remediating the flaw comprises selecting remediation tooling according to weld type.

10. The computer program product according to claim 6, wherein scanning the weld comprises collecting infra-red data about the weld.

11. A computer system for automated material welding, the computer system comprising:
    one or more computer processors;
    one or more computer readable storage devices; and
    stored program instructions on the one or more computer readable storage devices for execution by the one or more computer processors, the stored program instructions comprising:
    program instructions to collect a reference scan of parts prior to starting a welding operation;
    program instructions to start the welding operation;
    program instructions to scan a weld;
    program instructions to create a machine learning simulation of appearance of the weld;
    program instructions to detect a flaw in the weld according to the scanning and simulation;
    program instructions to remediate the flaw, wherein the flaw is remediated according to the reference scan of the parts; and
    program instructions to complete the welding operation.

12. The computer system according to claim 11, the stored program instructions further comprising program instructions to thermally temper the weld.

13. The computer system according to claim 11, wherein creating the simulation of the weld comprises simulating weld thermal stress/strain.

14. The computer system according to claim 11, wherein remediating the flaw comprises selecting remediation tooling according to weld type.

15. The computer system according to claim 11, wherein scanning the weld comprises collecting infra-red data about the weld.

* * * * *